(12) United States Patent
Merrill et al.

(10) Patent No.: US 9,606,814 B2
(45) Date of Patent: Mar. 28, 2017

(54) PROVIDING APPLICATION LOOK-AHEAD IN A STATE-BASED APPLICATION FRAMEWORK

(75) Inventors: Ethan K. Merrill, Durham, NC (US); Valerie M. Bennett, Macon, NC (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 12/650,973

(22) Filed: Dec. 31, 2009

(65) Prior Publication Data

US 2011/0161887 A1 Jun. 30, 2011

(51) Int. Cl.
| | |
|---|---|
| *G06F 3/048* | (2013.01) |
| *G06F 3/0482* | (2013.01) |
| *G06F 9/44* | (2006.01) |
| *G06F 3/0481* | (2013.01) |

(52) U.S. Cl.
CPC .......... *G06F 9/4446* (2013.01); *G06F 3/0481* (2013.01)

(58) Field of Classification Search
USPC ................................ 715/811, 835, 854, 862
See application file for complete search history.

(56) References Cited

U.S. PATENT DOCUMENTS

| | | | | |
|---|---|---|---|---|
| 5,564,004 | A | * | 10/1996 | Grossman et al. ........... 715/835 |
| 5,734,380 | A | * | 3/1998 | Adams et al. ................ 715/804 |
| 7,996,869 | B2 | * | 8/2011 | Tu et al. ........................ 725/80 |
| 2007/0028181 | A1 | * | 2/2007 | Tinari et al. .................. 715/764 |

\* cited by examiner

*Primary Examiner* — Jeffrey A Gaffin
*Assistant Examiner* — Nhat-Huy T Nguyen
(74) *Attorney, Agent, or Firm* — Terrile, Cannatti, Chambers & Holland, LLP; Stephen A. Terrile

(57) ABSTRACT

A method, system, and computer-usable medium are disclosed for providing navigation assistance within a user interface. A request for look-ahead navigation assistance is received and the user's current location within the application is determined. Application state data associated with the user's current location within the application is processed to generate possible destination locations within the application. The resulting possible location destinations within the application are then contextually displayed to the user within a user interface as graphical elements.

11 Claims, 6 Drawing Sheets

PROVIDING APPLICATION LOOK-AHEAD IN A STATE-BASED APPLICATION FRAMEWORK

BACKGROUND OF THE INVENTION

Field of the Invention

Embodiments of the disclosure relate in general to the field of computers and similar technologies, and in particular to software utilized in this field. Still more particularly, it relates to a method, system, and computer-readable medium for providing navigation assistance within a user interface.

Description of the Related Art

Software developers continue to introduce new and more sophisticated applications, usually at the expense of increasing the complexity of their underlying program code. This complexity often extends the application's graphical user interface (GUI) which in today's high-tech computing environment is often both "deep" and "dynamic." Such a GUI is "deep" if it takes a user multiple mouse clicks, or other user gestures, to get from his or her current location in the application to a desired location. A GUI is likewise considered to be "deep" if there are multiple ways for a user to accomplish the same task. Likewise, such a GUI is "dynamic" if different types of users have different kinds of functions to them. A GUI is also considered "dynamic" if the user can personalize or customize the interface options, which may include the addition or removal of a function within the GUI.

However, as GUIs become deeper and more dynamic, software developers are faced with the question of how to help users navigate complex applications. Current approaches for providing navigation assistance include the provision of a library of help pages that the user can access while within the application, mouse-over pop-up help, a collection of frequently asked questions (FAQs), and interactive help wizards. However, anticipating all possible user navigation scenarios becomes more challenging as applications grow in complexity. As an example, a user may reach the same destination, and its corresponding function, by taking multiple and different paths through an application.

BRIEF SUMMARY OF THE INVENTION

The present invention includes, but is not limited to, a method, system, and computer-usable medium for providing navigation assistance within a user interface. In various embodiments, a request for look-ahead navigation assistance is received by a look-ahead navigation module. The user's current location within the application is determined and application state data associated with the user's current location within the application is processed to generate possible destination locations within the application. The resulting possible location destinations within the application are then displayed to the user. In various embodiments, the user's current location and the possible destination locations are contextually displayed to the user within a user interface as graphical elements.

User input is then received from the user to select a desired destination location within the application. In various other embodiments, selection of the desired destination location initiates the traversal of the application to the selected destination location. Once the application is traversed, the selected destination location is displayed to the user, who then performs associated application operations. In various other embodiments, selection of the desired destination location initiates the execution of an associated process. Once the process is initiated, the results are displayed to the user without necessitating the user's traversal of the application to the associated destination location. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
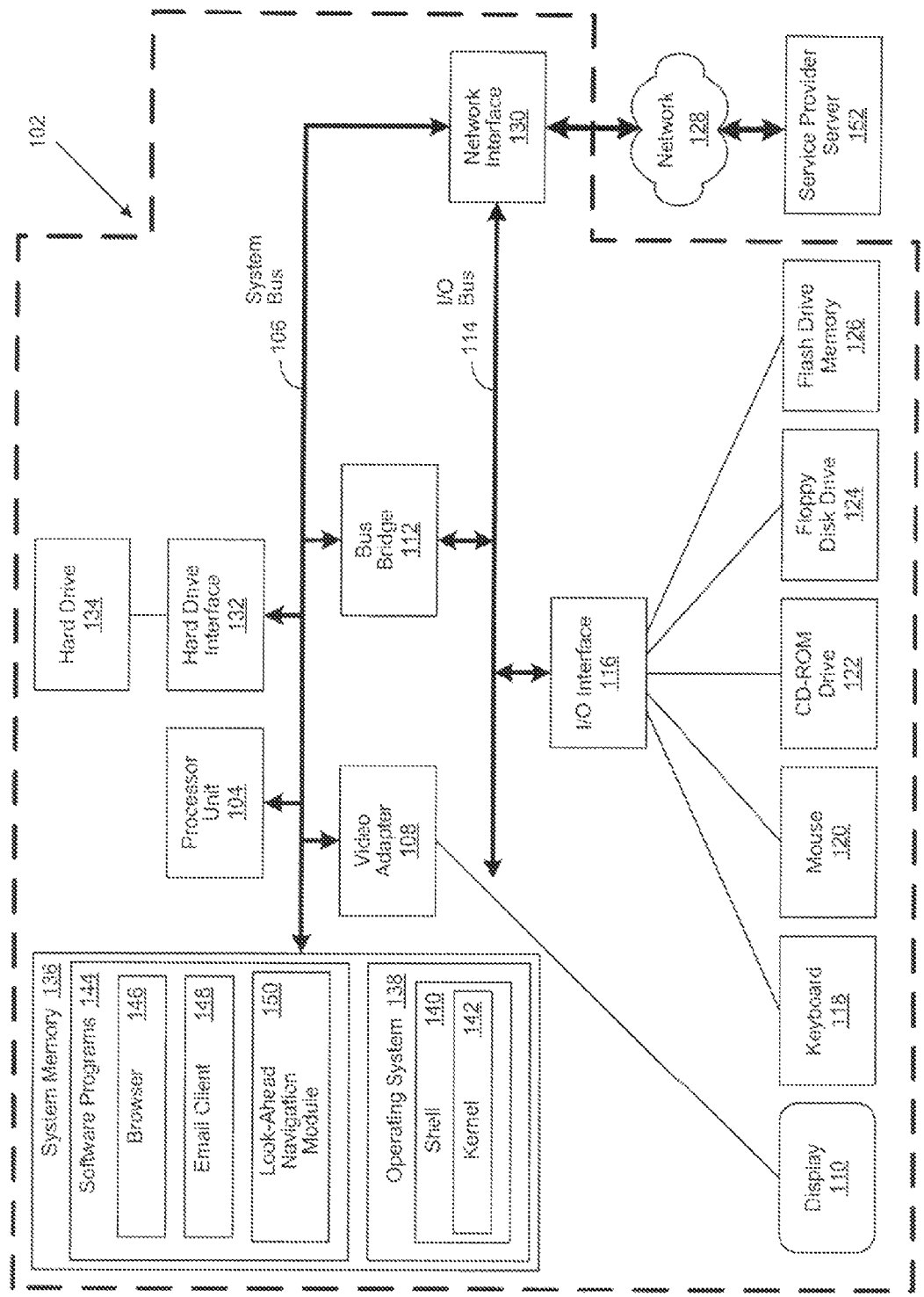
FIG. 1 depicts an exemplary client computer in which the present invention may be implemented.

A method, system, and computer-usable medium are disclosed for providing navigation assistance within a user interface. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. In the context of this document, a computer-usable or computer-readable medium may be any medium that can contain, store, communicate, propagate, or transport the program for use by or in connection with the instruction execution system, apparatus, or device. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (PO) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a look-ahead navigation module 150. The look-ahead navigation module 150 includes code for implementing the processes described in FIGS. 2 through 6 described hereinbelow. In one embodiment, client computer 102 is able to download the look-ahead navigation module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
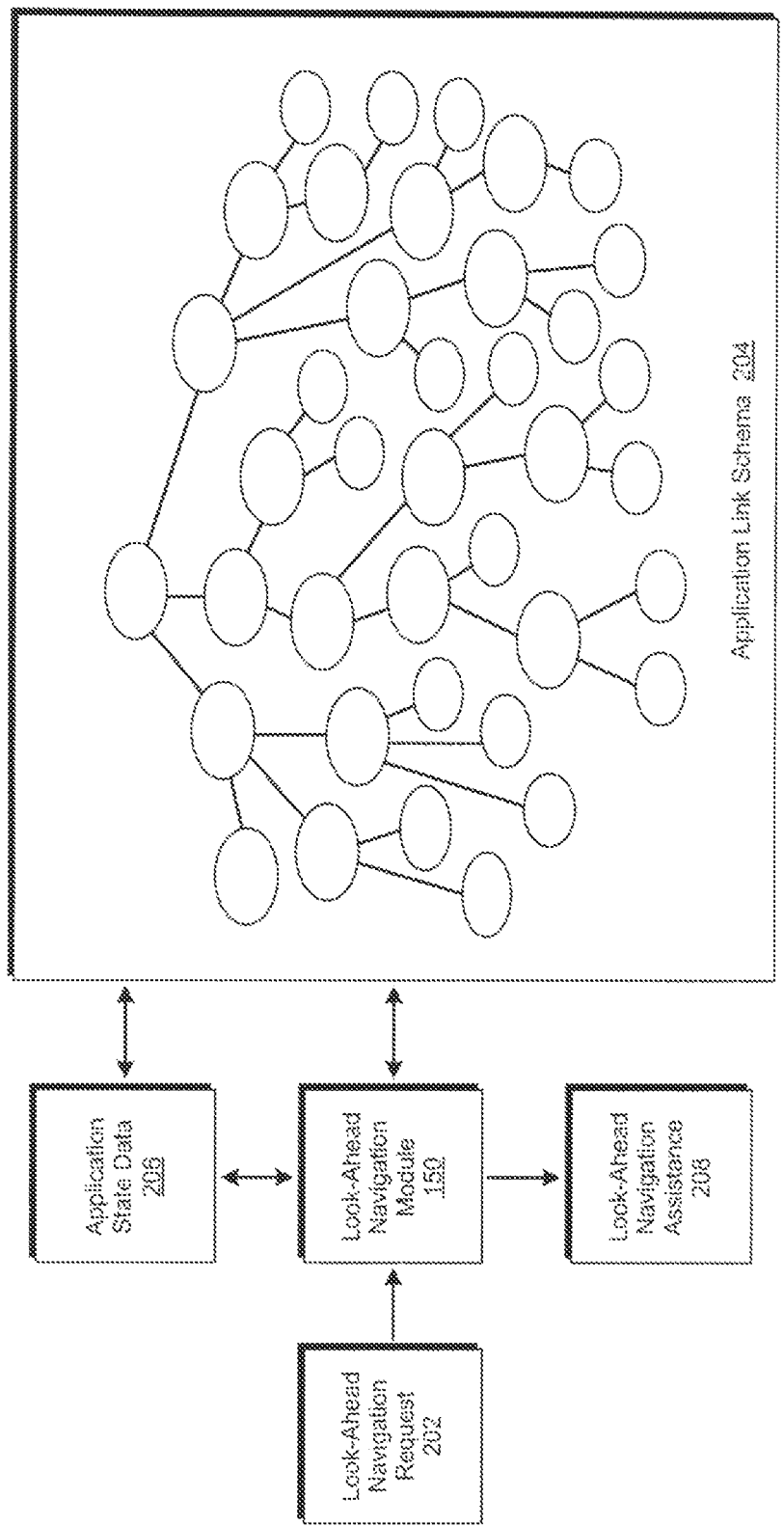
FIG. 2 shows a simplified block diagram of a look-ahead navigation module.

FIG. 2 shows a simplified block diagram of a look-ahead navigation module as implemented in accordance with an embodiment of the invention. In various embodiments, a look-ahead navigation module 150 is implemented with application state data 206 and an application link schema 204 to provide look-ahead navigation assistance 208 within a user interface of an application. In these and other embodiments, a request 202 for look-ahead navigation assistance is received by the look-ahead navigation module 150. In various embodiments, the request is received as a user gesture, such as a right-mouse click with a cursor on a graphical element within a user interface. The user's current location within the application is determined. Application state data 206 associated with the user's current location within the application is processed to generate possible destination locations within the application. The resulting possible location destinations within the application are then displayed to the user. In various embodiments, the user's current location and the possible destination locations are contextually displayed to the user within a user interface as graphical elements.

User input is then received from the user to select a desired destination location within the application. In various embodiments, the desired destination is selected with a user gesture, such as a left-mouse click with a cursor on a graphical element representing the desired destination location. In various embodiments, the user elects to initiate the execution of a process associated with the desired destination location or to traverse the application to the selected destination location.

In these and other embodiments, the application is traversed to the selected destination location through a user gesture, such as a right-mouse click with a cursor on a graphical element representing the selected destination location. Once the application is traversed, the selected destination location is displayed to the user, who then performs associated application operations. Likewise, the execution of the process associated with a selected destination location is similarly initiated with a user gesture, such as a right-mouse click with a cursor on a graphical element representing the selected destination location. As an example, the selected destination location may be associated with a process that calculates a user's current loan balances with a financial institution. Once the process is initiated, the results are displayed to the user without necessitating the user's traversal of the application to the associated destination location.

Figure 3:
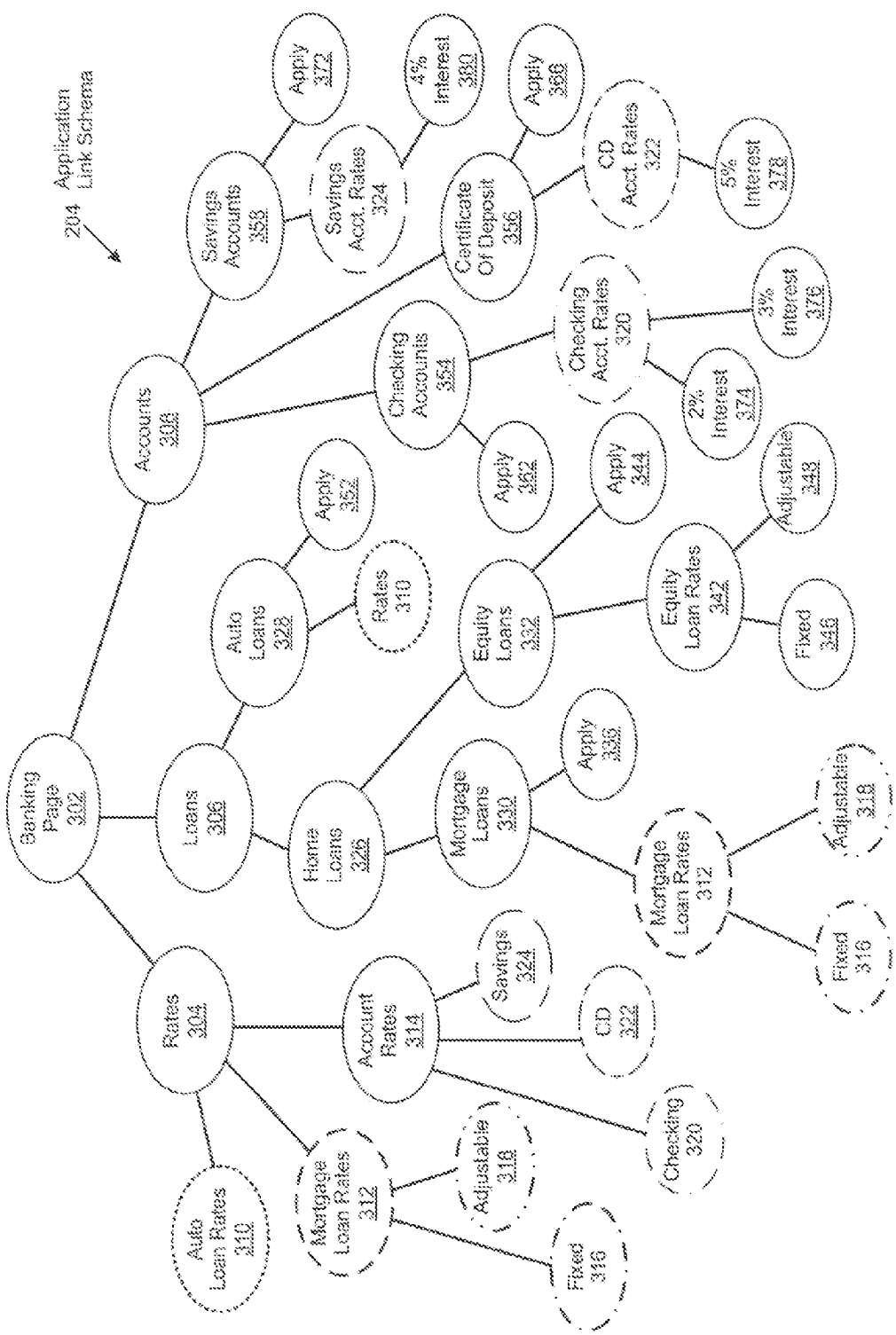
FIG. 3 shows a simplified block diagram of an application link schema as implemented with a look-ahead navigation module.

FIG. 3 shows a simplified block diagram of an application link schema as implemented with a look-ahead navigation module in accordance with an embodiment of the invention. In this embodiment, application link schema 204 comprises a 'Banking Page' 302 link, which further comprises a 'Rates' 304 link, a 'Loans' 306 link, and an 'Accounts' 308 link. The 'Rates' 304 link further comprises an 'Auto loan Rates' 310 link, a 'Mortgage Loan Rates' 312 link, and an 'Account Rates' 314 link. Likewise, the 'Mortgage Loan Rates' link 312 comprises 'Fixed' 316 and 'Adjustable' 318 links, while the 'Account Rates' link 314 comprises a 'Checking' 320, 'CD' 322, and 'Savings' 324 links. The 'Loans' 306 link comprises a 'Home Loans' 326 link, further comprising 'Mortgage Loans' 330 and 'Equity Loans' 332 links, and an 'Auto Loans' 328, further comprising 'Rates' 310 and 'Apply' links 352. The 'Mortgage Loans' 330 link comprises an 'Apply' 336 link and a 'Mortgage Loan Rates' 312 link, further comprising 'Fixed' 316 and 'Adjustable' 318 links. Likewise, the 'Equity Loans' 332 comprises an 'Apply' 344 link and an 'Equity Loan Rates' 342 link, further comprising 'Fixed' 346 and 'Adjustable' 348 links. The 'Accounts' 308 link comprises a 'Checking Accounts' 354 link, a 'Certificate Of Deposit' 356 link, and a 'Savings Accounts' 358 link. The 'Checking Accounts' 354 link comprises an 'Apply' 362 link and a 'Checking Accounts Rates' 320 link, further comprising '2% Interest' 374 and '3% Interest' 376 links. Likewise, the 'Certificate Of Deposit' 356 link comprises an 'Apply' 366 link and a 'CD Accounts Rates' 322 link, further comprising a '5% Interest' 378 link. The 'Savings Accounts' 358 link likewise comprises an 'Apply' 372 link and a 'Savings Accounts Rates' 324 link, further comprising a '4% Interest' 380 link.

Referring now to FIG. 3, it would be apparent to skilled practitioners of the art that the 'Auto Loan Rates' 310 link may be reached either by the 'Rates' 304 link or the 'Auto Loans' 328 link. Likewise, the 'Mortgage Loan Rates' 312 link may be reached by either the 'Rates' 304 link or the 'Mortgage Loan Rates' 312 link. Furthermore, the 'Fixed' 316 and 'Adjustable' 318 links may likewise be reached by the user traversing from either the 'Rates' 304 or 'Mortgage Loans' 330 links to the 'Mortgage Loan Rates' 312 link. Likewise, it will be apparent that the 'Checking Account Rates' 320, 'CD Account Rates' 322, and 'Savings Account Rates' 324 links may be reached either from the 'Account Rates' 314 or respectively from the 'Checking Accounts' 354, 'Certificate Of Deposit' 356, or 'Savings Accounts' 324 links. From the foregoing, it will be appreciated that there is a corresponding growth in the number of navigation paths available to the user as the number of links increases in an application. Likewise, as the number of navigation paths increases, the user may encounter additional challenges navigating to a desired destination location within the application.

Figure 4:
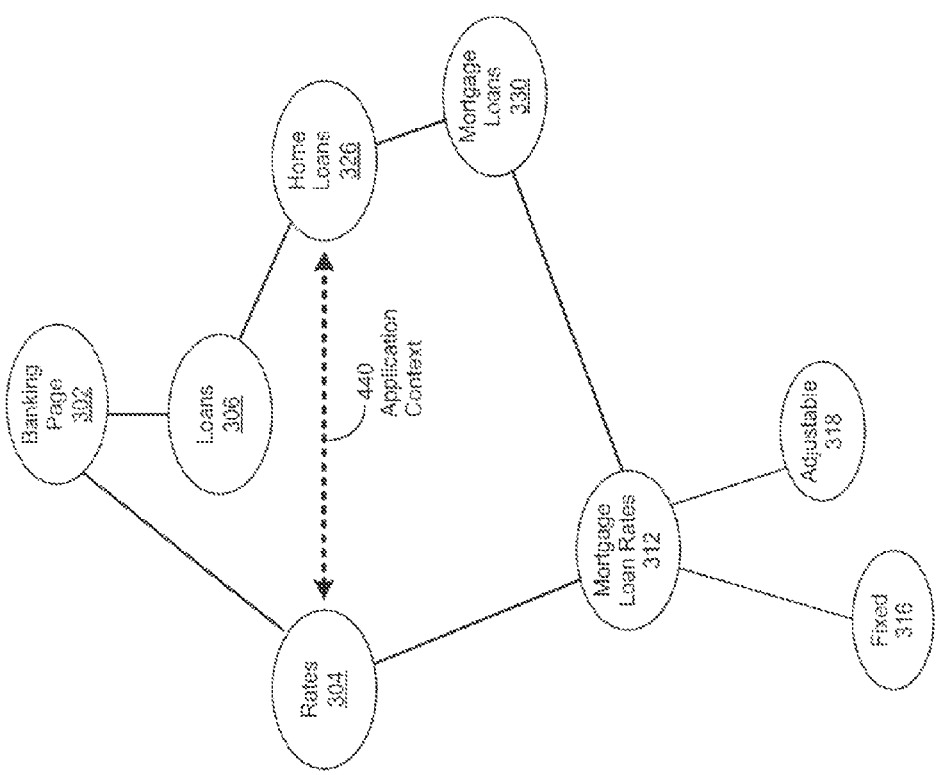
FIG. 4 shows a simplified block diagram of common destination locations within an application link schema as implemented with a look-ahead navigation module.

FIG. 4 shows a simplified block diagram of common destination locations within an application link schema as implemented with a look-ahead navigation module in accordance with an embodiment of the invention. In this embodiment, a 'Banking Page' 302 link comprises a 'Rates' 304 link and a 'Loans' 306 link. The 'Rates' 304 link comprises a 'Mortgage Loan Rates' 312 link, further comprising 'Fixed' 316 and 'Adjustable' 318 links. Likewise, the 'Loans' 306 link comprises a 'Home Loans' 326 link, further comprising a 'Mortgage Loans' 330 link, which in turn further comprises the 'Mortgage Loan Rates' 312 link, likewise comprising 'Fixed' 316 and 'Adjustable' 318 links.

In various embodiments, application state data associated with the user's current location within the application is processed to generate an application context 440, which in turn is used to generate possible destination locations within the application. The resulting possible location destinations within the application are then displayed to the user. In various embodiments, the user's current location and the possible destination locations are contextually displayed to the user within a user interface as graphical elements. As an example, a user may request look-ahead navigation assistance whether their current location within an application is at the 'Rates' 304 link or the 'Home Loans' 326 link. In both cases, the 'Mortgage Loan Rates' 312 link, comprising 'Fixed' 316 and 'Adjustable' 318 links, will be displayed as possible destination locations within the application. However, if the user's current location is at the 'Home Loans' 326 link, the 'Mortgage Loans' 330 link will also be shown as a possible destination location.

Figure 5:
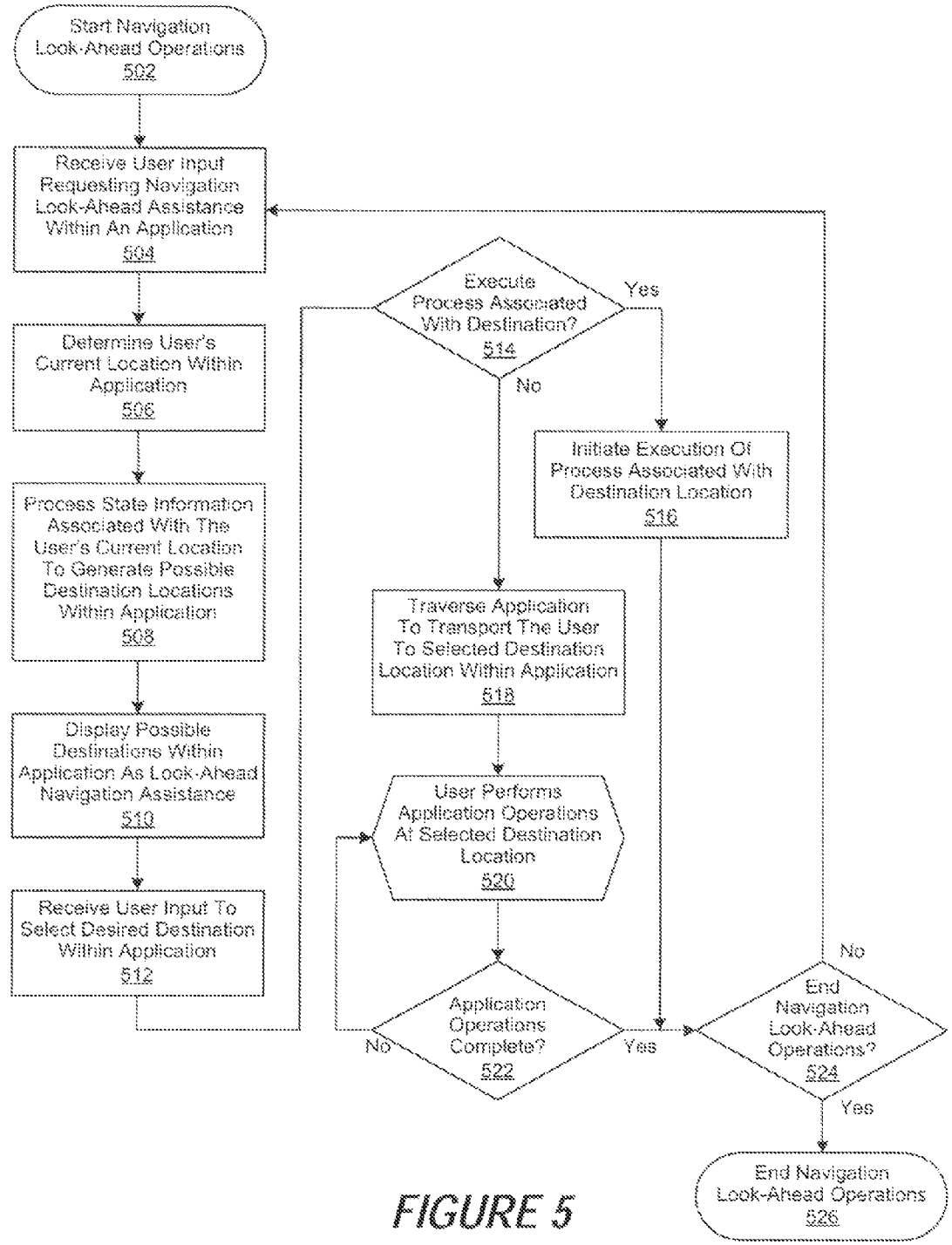
FIG. 5 is a generalized flowchart of the operation of a look-ahead module.

FIG. 5 is a generalized flow chart of the operation of a look-ahead module as implemented in accordance with an embodiment of the invention. In this embodiment, navigation look-ahead operations are begun in step 502, followed by receiving user input requesting navigation look-ahead assistance in step 504. In various embodiments, the request is received as a user gesture, such as a right-mouse click with a cursor on a graphical element within a user interface. In step 506, the user's current location within the application is determined. State information associated with the user's current location is then processed in step 508 to generate possible destination locations within the application. The resulting possible location destinations within the application are then displayed to the user in step 510. In various embodiments, the user's current location and the possible destination locations are contextually displayed to the user within a user interface as graphical elements.

In step 512, user input is received from the user to select a desired destination location within the application. In various embodiments, the desired destination is selected with a user gesture, such as a left-mouse click with a cursor on a graphical element representing the desired destination location. In various embodiments, the graphical element comprises a Uniform Resource Indicator (URI). In various other embodiments, the graphical element comprises an executable process. A determination is then made in step 514 whether to initiate the execution of a process associated with the desired destination location or to traverse the application to the selected destination location. If it is determined in step 514 to initiate the execution of a process associated with the selected destination location, then it is so initiated in step 516. In various embodiments, the execution of the process associated with a selected destination location is initiated with a user gesture, such as a right-mouse click with a cursor on a graphical element representing the selected destination location. As an example, the selected destination location may be associated with a process that calculates a user's current loan balances with a financial institution. Once the process is initiated, the results are displayed to the user without necessitating the user's traversal of the application to the associated destination location. Once execution of the process associated with a selected destination location is completed, a determination is made in step 524 whether to continue navigation look-ahead operations. If so, then the process is continued, proceeding with step 504. Otherwise, navigation look-ahead operations are ended in step 526.

However, if it is determined in step 514 to traverse the application to the selected destination location, then the application is traversed in step 516 and the selected destination location is displayed to the user. The user then performs operations associated with the selected destination location in step 520, followed by a determination being made in step 522 whether the operations have been completed. If not, the process is continued, proceeding with step 520. Otherwise, a determination is made in step 524 whether to continue navigation look-ahead operations. If so, then the process is continued, proceeding with step 504. Otherwise, navigation look-ahead operations are ended in step 526.

Figure 6:
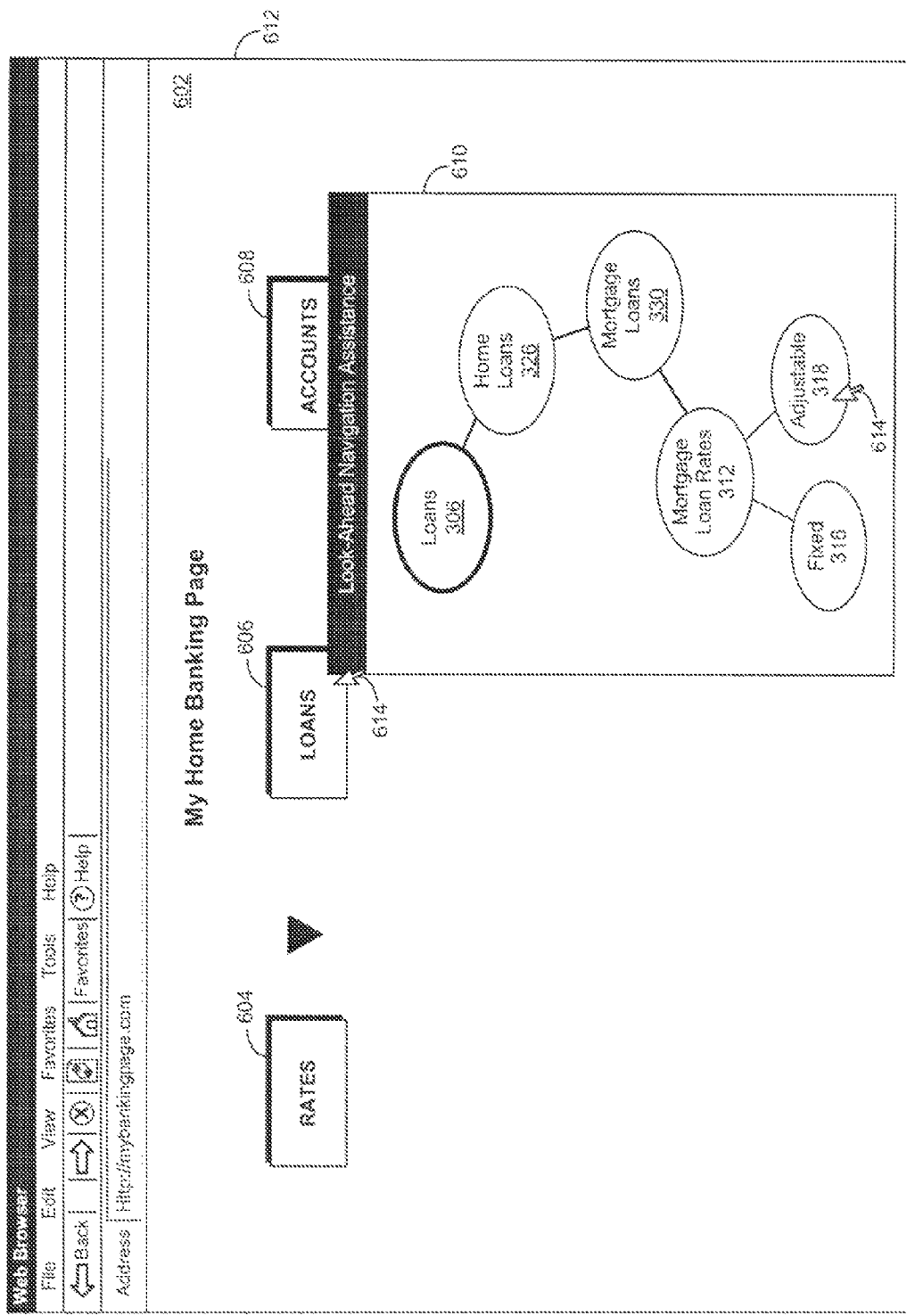
FIG. 6 shows the operation of a look-ahead module within a window of a user interface.

FIG. 6 shows the operation of a look-ahead module as implemented within a window of a user interface in accordance with an embodiment of the invention. In this embodiment, a user interface 612 of a look-ahead navigation module comprises a 'My Home Banking Page' 602 window, which further comprises 'Rates' 604, 'Loans' 606, and 'Accounts' 608 command buttons corresponding to links within an application.

As described in greater detail herein, navigation look-ahead operations are begun by receiving user input requesting navigation look-ahead assistance. In various embodiments, the request is received as a user gesture, such as a right-mouse click with a cursor 614 on the 'Loans' 606 command button within the 'My Home Banking Page' 602 window. The user's current location within the application is determined, followed by processing state information associated with the user's current location to generate possible destination locations within the application. The resulting possible location destinations within the application are then displayed to the user in the 'Look-Ahead Navigation Assistance' 610 window. As shown in FIG. 6, the user's current location ('Loans' 306) and possible destination locations 'Home Loans' 306, 'Mortgage Loans' 330, 'Mortgage Loan Rates' 312, 'Fixed' 316, and 'Adjustable' 318) are contextually displayed to the user within the 'Look-Ahead Navigation Assistance' 610 window.

User input is then received from the user to select a desired destination location within the application, such as the 'Adjustable' 318 link. In various embodiments, the desired destination is selected with a user gesture, such as a left-mouse click with the cursor 614 on the graphical element representing the 'Adjustable' 318 link. In various embodiments, the graphical element comprises a Uniform Resource Indicator (URI). In various other embodiments, the graphical element comprises an executable process.

In various other embodiments, selection of the desired destination location (e.g., the 'Adjustable' 318 link) initiates the traversal of the application to the selected destination location. Once the application is traversed, the selected destination location is displayed to the user, who then performs associated application operations. In various other embodiments, selection of the desired destination location (e.g., the 'Adjustable' 318 link) initiates the execution of an associated process. Once the process is initiated, the results are displayed to the user without necessitating the user's traversal of the application to the associated destination location.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for providing navigation assistance within a software application, comprising processing logic used for:
    determining a user's current location within the software application;
    processing state information associated with the user's current location and an application link schema to generate an application context, the application context being used to generate possible destination locations within the software application; and
    displaying the possible destination locations to the user within a user interface based upon the state information and the application link schema, the displaying comprising presenting all possible destination locations within a look ahead navigation assistance window, the look ahead navigation assistance window presenting all possible destination locations contextually, the presenting all possible destination locations contextually includes providing a representation of interrelated conditions in which all possible destination locations exist, the representation of interrelated conditions comprising a branching representation of all possible destination locations;
    receiving user input data within the user interface, the user input data comprising destination location selection data;
    processing the destination location selection data to traverse to the selected destination location; and
    displaying data associated with the destination location within the user interface; and wherein
    the data associated with the destination location comprises an executable process;
    user input data is received within the user interface, the user input data comprising process selection data used to initiate execution of the executable process; and,
    when the executable process is initiated, results are displayed to the user without necessitating traversal to the associated destination location.

2. The method of claim 1, wherein the user's current location and the possible destination locations are contextually displayed as graphical elements within the user interface.

3. The method of claim 2, wherein the graphical elements comprise Uniform Resource Indicators (URIs).

4. A system comprising:
    a processor;
    a data bus coupled to the processor; and
    a computer-usable medium embodying computer program code, the computer-usable medium being coupled to the data bus, the computer program code providing navigation assistance within a software application and comprising instructions executable by the processor and configured for:
        determining a user's current location within the software application;
        processing state information associated with the user's current location and an application link schema to generate an application context, the application context being used to generate possible destination locations within the software application; and
        displaying the possible destination locations to the user within a user interface based upon the state information and the application link schema, the displaying comprising presenting all possible destination locations within a look ahead navigation assistance window, the look ahead navigation assistance window presenting all possible destination locations contextually, the presenting all possible destination locations contextually includes providing a representation of interrelated conditions in which all possible destination locations exist, the representation of interrelated conditions comprising a branching representation of all possible destination locations;
        receiving user input data within the user interface, the user input data comprising destination location selection data;
        processing the destination location selection data to traverse the user interface to the selected destination location; and
        displaying data associated with the destination location within the user interface; and wherein
    the data associated with the destination location comprises an executable process;
    user input data is received within the user interface, the user input data comprising process selection data used to initiate execution of the executable process; and,
    when the executable process is initiated, results are displayed to the user without necessitating traversal to the associated destination location.

5. The system of claim 4, wherein the user's current location and the possible destination locations are contextually displayed as graphical elements within the user interface.

6. The system of claim 4, wherein the graphical elements comprise Uniform Resource Indicators (URIs).

7. A non-transitory computer-usable medium embodying computer program code, the computer program code comprising computer executable instructions configured for:
    determining a user's current location within a software application;
    processing state information associated with the user's current location and an application link schema to generate an application context, the application context being used to generate possible destination locations within the software application; and
    displaying the possible destination locations to the user within a user interface based upon the state information and the application link schema, the displaying comprising presenting all possible destination locations within a look ahead navigation assistance window, the look ahead navigation assistance window presenting all possible destination locations contextually, the presenting all possible destination locations contextually includes providing a representation of interrelated conditions in which all possible destination locations exist, the representation of interrelated conditions comprising a branching representation of all possible destination locations;

receiving user input data within the user interface, the user input data comprising destination location selection data;

processing the destination location selection data to traverse to the selected destination location; and displaying data associated with the destination location within the user interface; and wherein the data associated with the destination location comprises an executable process;

user input data is received within the user interface, the user input data comprising process selection data used to initiate execution of the executable process; and, when the executable process is initiated, results are displayed to the user without necessitating traversal to the associated destination location.

8. The computer usable medium of claim 7, wherein the user's current location and the possible destination locations are contextually displayed as graphical elements within the user interface.

9. The computer usable medium of claim 7, wherein the graphical elements comprise Uniform Resource Indicators (URIs).

10. The computer usable medium of claim 7, wherein the computer executable instructions are deployable to a client computer from a server at a remote location.

11. The computer usable medium of claim 7, wherein the computer executable instructions are provided by a service provider to a customer on an on-demand basis.

* * * * *